United States Patent [19]

Kumano et al.

[11] Patent Number: 5,091,876
[45] Date of Patent: Feb. 25, 1992

[54] MACHINE TRANSLATION SYSTEM

[75] Inventors: Akira Kumano; Hiroyasu Nogami; Seiji Miike, all of Yokohama; Hisahiro Adachi, Chigasaki; Shin-ya Amano, Yokohama, all of Japan

[73] Assignee: Kabushiki Kaisha Toshiba, Kawasaki, Japan

[21] Appl. No.: 453,069

[22] Filed: Dec. 18, 1989

Related U.S. Application Data

[63] Continuation of Ser. No. 898,020, Aug. 19, 1986, abandoned.

[30] Foreign Application Priority Data

Aug. 22, 1985 [JP] Japan .................. 60-184943

[51] Int. Cl.⁵ .................................. G06F 15/38
[52] U.S. Cl. ...................... 364/419; 364/DIG. 2; 364/920.4; 364/927.63; 364/943.43; 364/943.44; 434/157; 340/723
[58] Field of Search .............. 364/419, 200, 900; 434/157

[56] References Cited

U.S. PATENT DOCUMENTS

| | | | |
|---|---|---|---|
| 4,193,119 | 3/1980 | Arase et al. | 364/900 |
| 4,240,075 | 12/1980 | Bringol . | |
| 4,404,554 | 9/1983 | Tweedy, Jr. et al. | 340/750 |
| 4,412,305 | 10/1983 | Yoshida | 364/900 |
| 4,502,128 | 2/1985 | Okajima et al. | 364/900 |
| 4,567,573 | 1/1986 | Hashimoto et al. | 364/900 |
| 4,599,612 | 7/1986 | Kaji et al. | 340/723 |
| 4,654,798 | 3/1987 | Taki et al. | 364/419 |
| 4,658,374 | 4/1987 | Tanimoto et al. | 364/900 |
| 4,661,924 | 4/1987 | Okhmoto et al. | 364/900 |
| 4,685,060 | 8/1987 | Yamano et al. | 364/419 |
| 4,730,270 | 3/1988 | Okajima et al. | 364/900 |
| 4,774,666 | 9/1988 | Miyao et al. | 364/419 |
| 4,775,956 | 10/1988 | Kaji et al. | 364/900 |
| 4,787,038 | 11/1988 | Doi et al. | 364/419 |
| 4,791,587 | 12/1988 | Doi | 364/900 |
| 4,805,132 | 2/1989 | Okamoto et al. | 364/900 |
| 4,821,230 | 4/1989 | Kumano et al. | 364/900 |

OTHER PUBLICATIONS

Fujitsu Scientific & Technical Journal, vol. 21, No. 3, Jul. 1985, pp. 317-329, Kawasaki, JP; H. Uchida et al., "ATLAS: Automatic Translation System".

AFIPS Joint Computer Conference 1977, Dallas, Jun. 13-16, 1977, vol. 46, pp. 789-790, Montvale, U.S.; D. A. Luther et al., "An Interactive Text-Editing System in Support of Russian Translation by Machine".

Primary Examiner—Gareth D. Shaw
Assistant Examiner—Matthew C. Fagan
Attorney, Agent, or Firm—Oblon, Spivak, McClelland, Maier & Neustadt

[57] ABSTRACT

A machine translation system has a display section, an original storage section for storing an original sentence, a dictionary storing linguistical information necessary for translation processing, a translation processing section for translating the original sentence for each predetermined processing unit to obtain a translated sentence, a translation storage section for storing the translated sentence, an edit processing section for executing edit processing for the original and translated sentences, and an input section for inputting instruction information. In addition, the system has a display control section for realizing a first display mode for displaying the original and translated sentences respectively on original and translation display sections of a display screen of the display section, a second display mode for mainly displaying the original sentences on the display screen, and a third display mode for mainly displaying the translated sentences on the display screen. The display control section selectively switches the three display modes in response to information for instructing a display mode switching operation.

5 Claims, 9 Drawing Sheets

FIG. 6C

| SENTENCE NUMBER | ORIGINAL-SENTENCE POINTER | TRANSLATED-SENTENCE POINTER |
|---|---|---|
| 1 | 0 | 0 |
| 2 | 117 | 126 |
| 3 | 285 | 314 |
| 4 | 458 | 503 |
| 5 | 572 | 671 |
| ⋮ | ⋮ | ⋮ |

7

MACHINE TRANSLATION SYSTEM

CROSS REFERENCE TO RELATED APPLICATIONS

This application is a continuation of application Ser. No. 898,020 filed Aug. 19, 1986, now abandoned, and is related to commonly owned copending U.S. application Ser. No. 07/388,755.

BACKGROUND OF THE INVENTION

The present invention relates to a machine translation system for processing an original sentence of a first language to obtain a translated sentence of a second language and, more particularly, to a machine translation system which can improve translation efficiency.

In recent years, various machine translation systems for translation using a computer system have been developed, e.g., a processing system for translating English sentences into Japanese sentences or vice versa, and the like.

A basic processing operation in these systems will be briefly described. Morphemes constituting an input original sentence or its sentence structure is analyzed to divide the original sentence into predetermined processing units, e.g., words (or phrases). A translation dictionary is referred to for each processing unit to obtain a translated word (or phrase) corresponding to the processing unit. The translated words (or translated phrases) are combined in accordance with a given translation rule, thus obtaining a translated sentence.

However, since a reliable technique for interpreting the meaning of a natural language has not yet been established, it is difficult to immediately obtain an appropriate translated sentence through the machine translation. More specifically, an English word "find", for example, has meanings including "to learn", "to perceive", "to come upon", "to attain", "to solve", "to detect", "to uncover", and "to discover". When this word must be translated into Japanese, it has different translated words corresponding to the above meanings. In this manner, a single original word often has a plurality of translation possibilities. In this case, selection of a translated word possibility largely influences the translation quality from an original sentence into a translated sentence.

In a conventional system, a plurality of translation possibilities corresponding to a processing unit (original word) are presented to an operator, and the operator determines and selects an appropriate translated word to constitute a translated sentence.

However, even if a translated sentence is obtained in this manner, an inappropriate translated word often still remains in the translated sentence. For this reason, the operator must correct the inappropriate translated word in the translated sentence through post-edit processing.

When such edit processing is performed, if a display device has a fixed display format for the translation result, this results in very poor operability. For example, when a translated sentence including translated words to be corrected and its original sentence are displayed to correspond to each other and translation/edit processing is performed while comparing the two sentences, this allows easy understanding of the correspondence between the two sentences. However, it is hard to grasp consistency or context in the document. As a result, even though appropriate translated words can be obtained for each translated sentence, the translated sentence may be inappropriate in the entire document.

In contrast to this, original sentences and their translated sentences can be displayed continuously, respectively. In this case, the above-mentioned drawbacks can be compensated for, and the context or consistency in the entire document can be satisfactorily grasped.

However, with this method, it is difficult to easily and reliably grasp the correspondence between the original and translated sentences and that between original and translated words therein.

The efficiency of the translation/edit processing is impaired in accordance with display formats of the translation result, thereby interfering with effective post processing.

SUMMARY OF THE INVENTION

It is an object of the present invention to provide a machine translation system with which context or consistency in a document can be appropriately grasped, and the correspondence between an original sentence and a translated sentence can be easily understood to allow efficient translation/edit processing.

According to the present invention, a machine translation system performs translation processing of an original sentence by referring to linguistical information necessary for translation stored in a dictionary section, and the resultant translated sentence and the original sentence are displayed to perform edit processing of the translated sentence. In this system, the original and translated sentences are managed to correspond to each other. Upon switching of a display mode of a display section, only the original or translated document is continuously displayed on a main portion of the display section, or a display screen of the display section is divided, so that the corresponding sentences of the original and translated documents are displayed in correspondence with each other. In this manner, the translation result can be displayed in an appropriate format in acccordance with translation/edit state for the translated sentence.

According to the present invention, since the display format of the original sentence and/or the translated sentence can be appropriately changed upon switching of the display mode. When the original and translated sentences are displayed to correspond to each other, translation/edit processing for the translated sentence can be effectively performed while clearly understanding the correspondence therebetween. When only the original sentences are displayed successively as a document, this allows easy understanding of the context in the document. In addition, when the translated sentences are successively displayed as a document, this also allows easy understanding of the context in the document.

Therefore, it is easy for an operator to determine the quality of the translation result and to perform a translation/edit operation, thus effectively obtaining a translated sentence of appropriate linguistical expression.

BRIEF DESCRIPTION OF THE DRAWINGS

FIGS. 6A to 6C are representations for explaining storage formats of original and translated sentences and their correspondence management;

DETAILED DESCRIPTION OF THE PREFERRED EMBODIMENT

Figure 1:
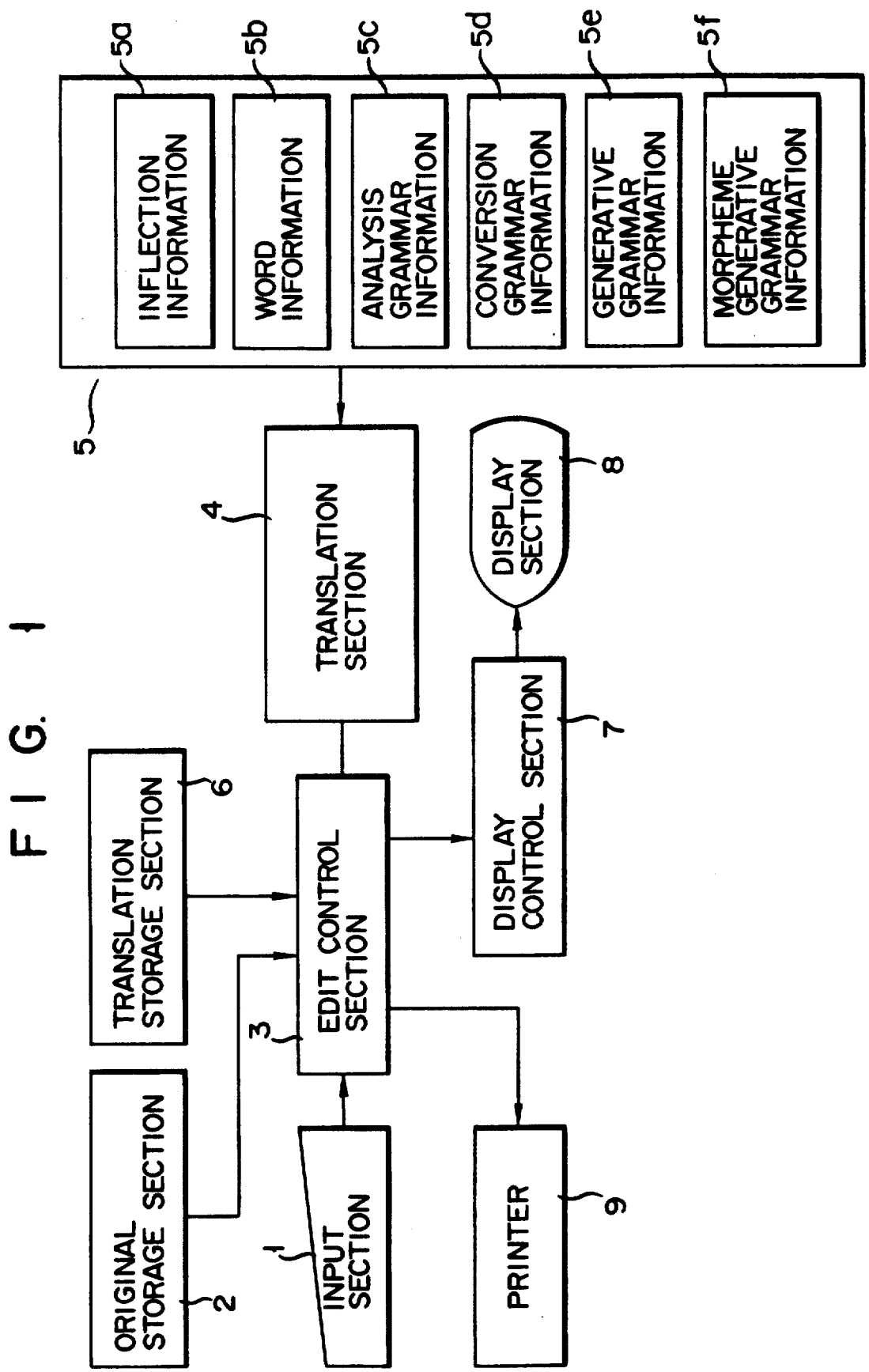
FIG. 1 is a schematic block diagram of a machine translation system according to an embodiment of the present invention.

FIG. 1 shows a machine translation system according to an embodiment of the present invention. In this embodiment, English sentences are input and are translated into Japanese sentences.

An English sentence input at input section 1 comprising a keyboard is stored in original storage section 2 as an original sentence to be translated.

Translation section 4 is operated under the control of edit control section 3. Translation section 4 refers to linguistical information necessary for translation processing prestored in dictionary section 5 to sequentially translate predetermined processing units of the original sentence stored in section 2.

Note that the linguistical information stored in dictionary section 5 includes, e.g., inflection (regular and irregular inflection) information 5a, word (translated word) information 5b, analysis grammar information 5c, conversion grammar information 5d, generative grammar information 5e, and morpheme generative grammar information 5f. Japanese sentences as translated sentences, which are obtained through machine translation by referring to the linguistical information, are sequentially stored in translation storage section 6.

Edit control section 3 drives display control section 7 to simultaneously display, on display section 8, the English and Japanese sentences respectively stored in sections 2 and 6, so that the display positions of the corresponding sentences are arranged side by side, thus preparing for post-edit processing for the translated sentences. The post-edit processing is executed by, e.g., referring to the linguistical information stored in dictionary section 5 in accordance with control information input from input section 1.

The translated sentences (Japanese sentences) corresponding to the original sentences (English sentences), which are subjected to the post-edit processing, are hard-copied by printer 9.

Figure 2:
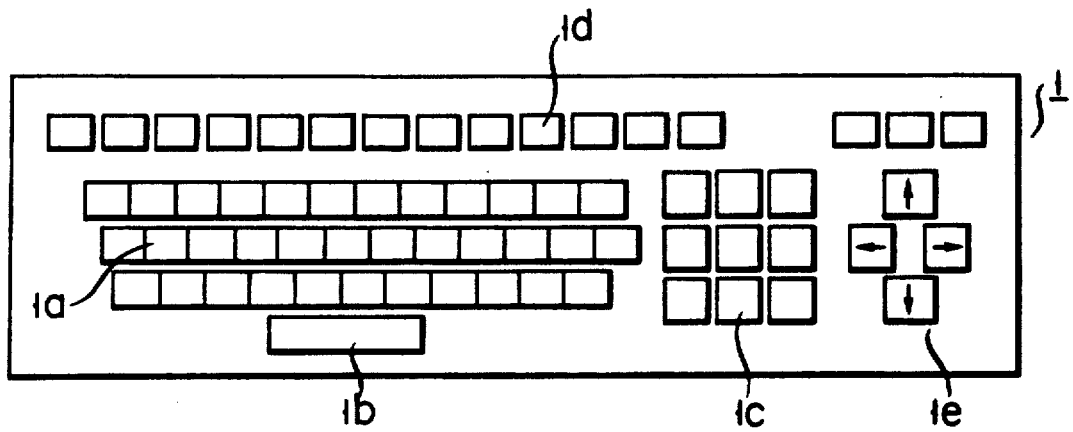
FIG. 2 is a schematic illustration of a keyboard as an input section in the system shown in FIG. 1.

FIG. 2 illustrates a keyboard constituting input section 1. The keyboard includes character data input key group 1a, translation instruction key group 1b, edit key group 1c, function key group 1d, cursor control key group 1e on display section 8, and the like.

Figure 3:
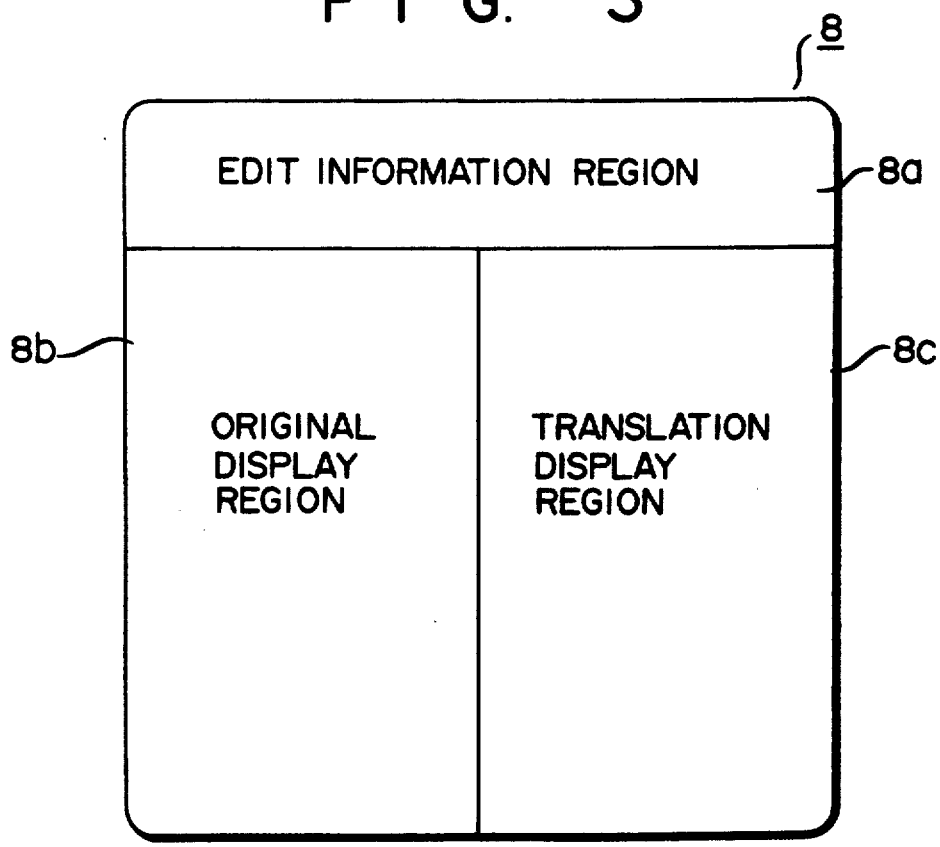
FIG. 3 is a format of a display screen of a display section in the system of FIG. 1.

FIG. 3 illustrates a display screen of display section 8 for displaying the original and translated sentences. In this embodiment, the display screen is divided into three regions, edit information region 8a at an upper side of the screen, original display region 8b at the left of the screen, and translation display region 8c at the right of the screen. The input original sentences stored in storage section 2 are sequentially displayed on region 8b, and the translated sentences stored in storage section 6 are displayed on region 8c at positions corresponding to the original sentences. Note that information necessary for translation processing, e.g., translation possibilities, which are searched from dictionary section 5 and are subjected to translation processing, is displayed on region 8a.

Figure 4:
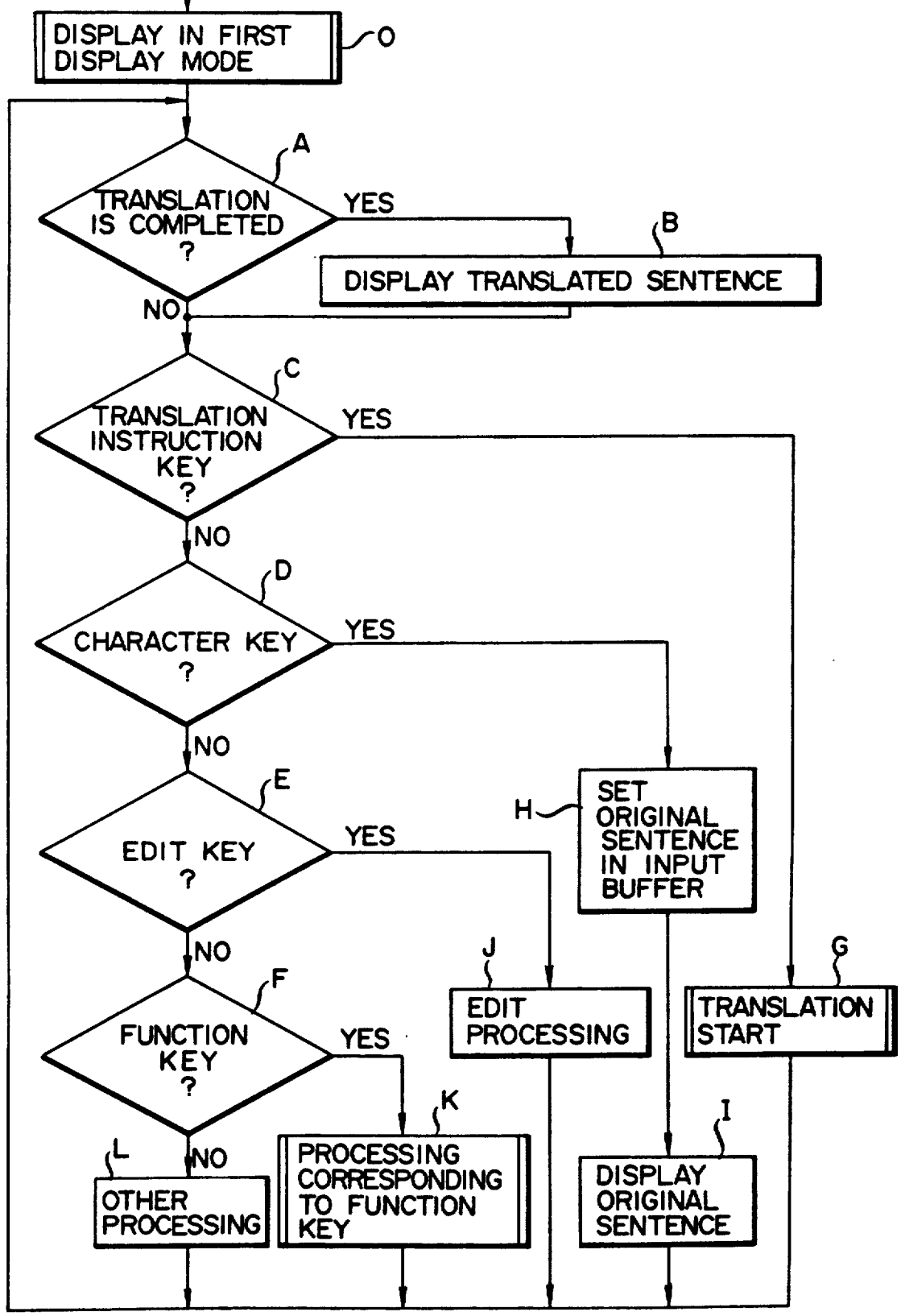
FIG. 4 is a flow chart of a basic operation sequence in the system of FIG. 1.

FIG. 4 shows a basic operation sequence of the system shown in FIG. 1. Edit control section 3 discriminates translation end information supplied from translation section 4 and various key information input from input section 1 in accordance with the operation sequence shown in FIG. 4, and controls the translation/edit processing in a conversational manner.

Edit control section 3 causes display section 8 to display the original and translated sentences side by side in the first display mode, as shown in FIG. 3 (step O). Section 3 then monitors a translation processing state in translation section 4 (step A). When section 3 detects completion of the translation processing for a single original sentence, it causes storage section 6 to store the translated sentence and causes display section 8 to display it in correspondence with its original sentence (step B).

During the translation processing in translation section 4 or when no translation processing is performed, section 3 discriminates key information input from input section 1 (steps C, D, E, and F). If the input key information represents a "translation instruction key" (step C), section 3 transfers the input original sentence stored in storage section 2 to translation section 4 to initiate the translation processing (step G).

If the input key information represents a "character key" (step D), its character code is stored in an input buffer (step H) and is also stored in storage section 2, and the character (character pattern) is displayed on display section 8 (step I). When the characters corresponding to the character codes stored in the input buffer are displayed, an original sentence input from section 1 is displayed.

If the input key information represents an "edit key" (step E), edit processing associated with the edit key is executed for the translated sentence (step J). Similarly, if the input key information represents a "function key" (step F), processing corresponding thereto is executed (step K).

If there is no key information or if the input key information is other than the above-mentioned keys, other processing, e.g., hard-copy output of the translated sentence stored in section 6 (by means of printer 9), is executed.

With this operation sequence of edit control section 3, when an operator operates character input key group 1a of the keyboard to input characters, the character information is sequentially set in the input buffer, and is also stored in storage section 2 as an original to be translated (steps D and H). The input original sentence is displayed on region 8b of section 8 (step I).

If translation instruction key 1b is operated at an arbitrary time during a character input operation, e.g., when inputting of one sentence is completed, the translation processing for the input original stored in the input buffer is started in accordance with the key input (steps C and G). Upon completion of the translation processing, the translated sentence obtained there-through is displayed on region 8c of section 8 (steps A and B).

If the input original sentence must be edited, e.g., corrected, for example, cursor control key group 1e is operated to adjust a cursor position at a correction position during the original sentence input operation using key group 1a, and the edit processing is then executed by operating edit key group 1c, e.g., correct, insert, delete keys, and the like (steps E and J).

In this manner, the basic operation of the machine translation processing is controlled.

The translation processing (step G) for the original sentence is executed, e.g., as follows.

Figure 5:
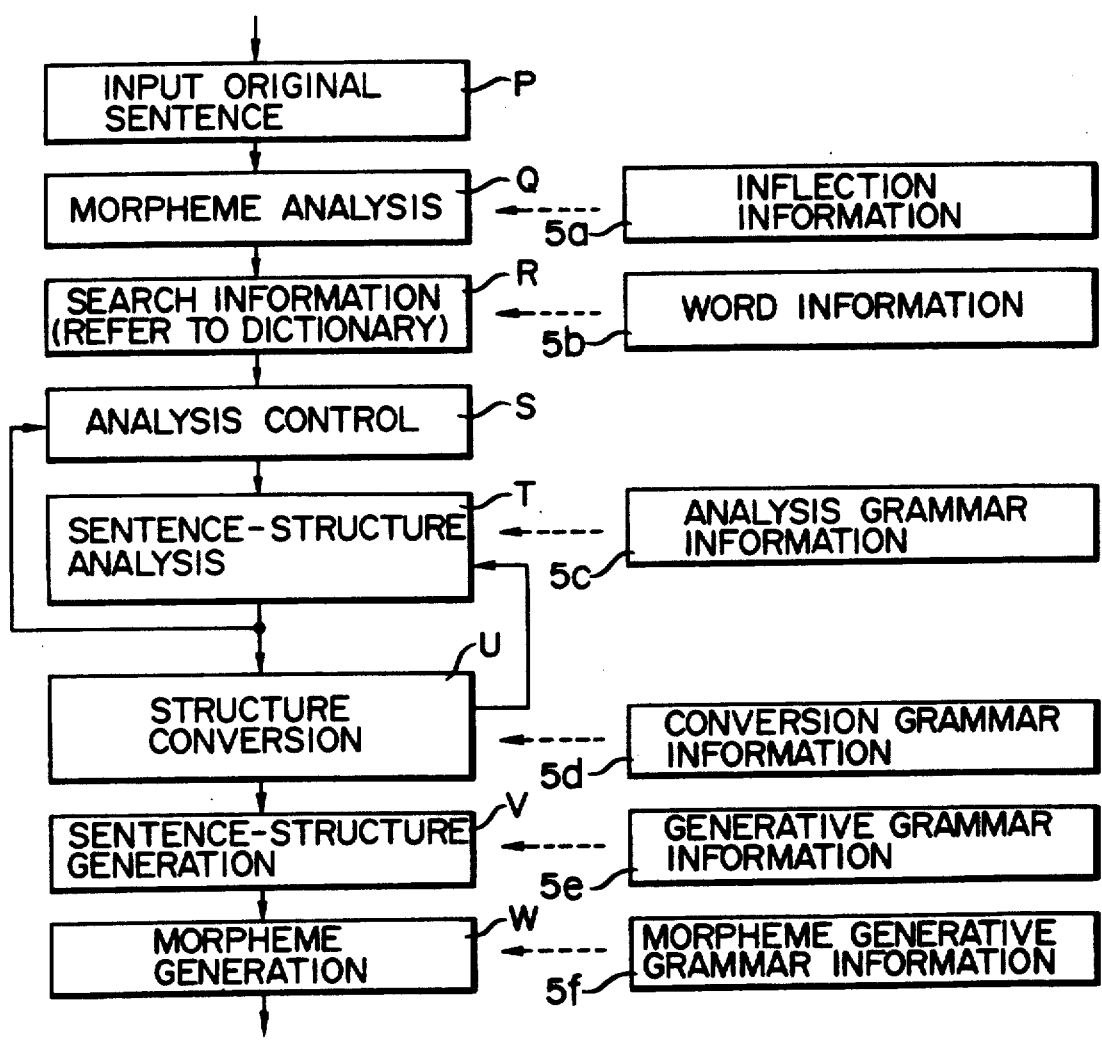
FIG. 5 is a flow chart of a translation processing sequence in the system of FIG. 1.

FIG. 5 shows a processing sequence of the translation processing (step G).

Translation section 4 first receives an original sentence to be translated (step P), and analyzes the input original sentence in units of morphemes (step Q). Morpheme analysis processing includes processing for converting an original word, which is, for example, conjugated or inflected, into its original form (fundamental form), using inflection dictionary 5a stored in dictionary section 5. For the morpheme analyzed original words, their part-of-speech information and translated word information and other properties are derived with reference to word information 5b (step R). This processing is performed by accessing word information 5b using the original word as a keyword.

Sentence-structure analysis of the original sentence is performed (step T) under the predetermined analysis control according to analysis grammar information 5c (step S). Sentence-structure analysis is repetitively performed until it is successful. With this sentence-structure analysis, the arrangement of part-of-speeches of the original words constituting the original sentence, their modification relationship, the mode of tense, and the like are obtained.

Thereafter, the analyzed sentence structure is converted to the sentence structure of the translated sentence using conversion grammar information 5d (step U). In other words, the sentence structure of an English sentence (original sentence) is converted to that of a Japanese sentence (translated sentence) using conversion grammar information 5d. If sentence-structure conversion is unsuccessful, it is determined that sentence-structure analysis of the original sentence is erroneously performed and is performed again.

Translation possibilities obtained for the respective words of the original sentence based on the sentence structure of the translated sentence are sorted in a word order according to the linguistical format of the translated sentence to obtain a translated sentence possibility corresponding to the original sentence (step V). This sentence-structure generation processing is executed in accordance with generative grammar information 5e. The translated word possibilities constituting the translated sentence possibility are conjugated and inflected in accordance with the sentence-structure generation result and morpheme generative grammar information 5f, thus completing the translated sentence (step W).

The translated sentence corresponding to its original sentence obtained through the translation processing is stored in storage section 6, and is displayed to correspond with the original sentence. If a plurality of translated sentences corresponding to a single original sentence are obtained, for example, only one translated sentence is displayed and, at the same time, a message indicating the presence of other translated sentences is displayed.

After the translated and original sentences are displayed on display section 8, if there is an input representing edit key 1c, the following translation/edit processing for the translated sentence is performed.

Basically, the translation/edit processing for the translated sentence is realized by executing processing corresponding to operated edit key 1c with respect to a word (original word, original phrase, translated word, or translated phrase) indicated by the cursor on the screen of display section 8. More specifically, this processing is performed as follows:

(1) Upon operation of an insert key, a character is inserted before a cursor position.
(2) Upon operation of a delete key, a character string within a range indicated by the cursor is deleted.
(3) Upon operation of a move key, a character string within a range indicated by the cursor is moved.
(4) Upon operation of a cancel key, respective edit functions specified by the corresponding keys are made invalid.
(5) Upon operation of a modification key, other modification possibilities of a word indicated by the cursor are displayed.

When function key 16d is operated, the following functions can be used in the translation/edit processing for the translated sentence.

(1) Upon operation of a translated word display key, a translated word for a word in an original sentence indicated by the cursor is displayed.
(2) Upon operation of a dictionary display key, the content of dictionary section 5 is displayed using a word in an original sentence indicated by the cursor as a keyword.
(3) Upon operation of a dictionary registration key, a character string indicated by the cursor is registered in dictionary section 5 as a new word or phrase.
(4) Upon operation of a dictionary clear key, the registered new words or phrases are cleared.
(5) Upon operation of a partial translation key, a partial translation for an original sentence which is indicated by the cursor and has not been successfully translated is displayed.

Note that indication of a character string (word) by mean of the cursor is performed while moving the cursor on the display screen using cursor moving keys 1e and enlarging or reducing a cursor size by a cursor control key.

Upon use of the above functions, post processing, e.g., correction of translated words, for the translated sentence is performed in a conversational manner.

The basic translation/edit processing in this system has been described. In addition to this, the system of this embodiment has the following display control function.

Figure 6A:
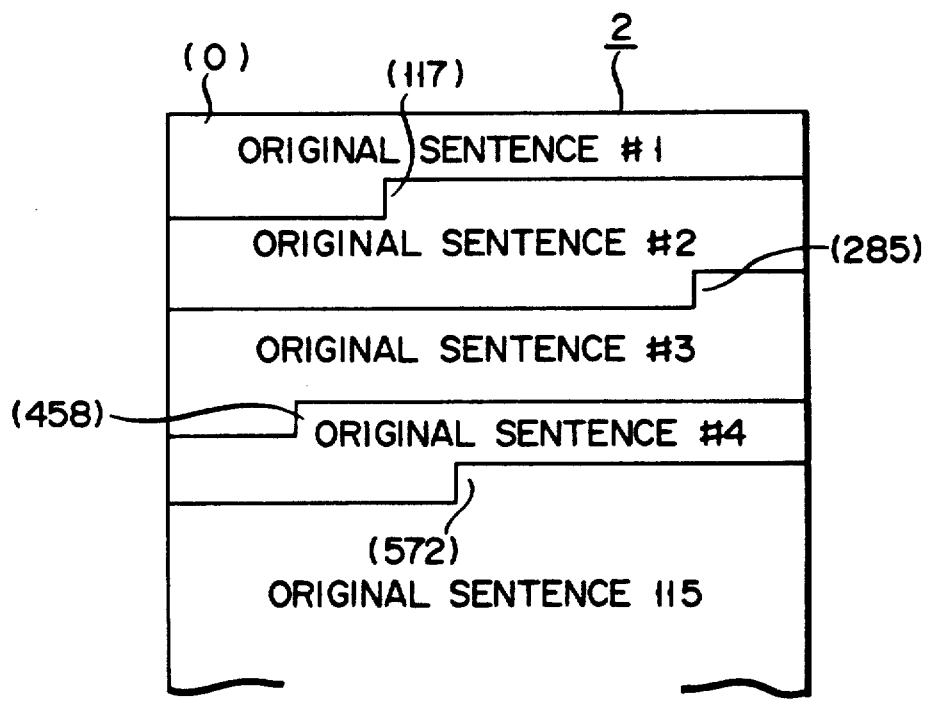
Figure 6B:
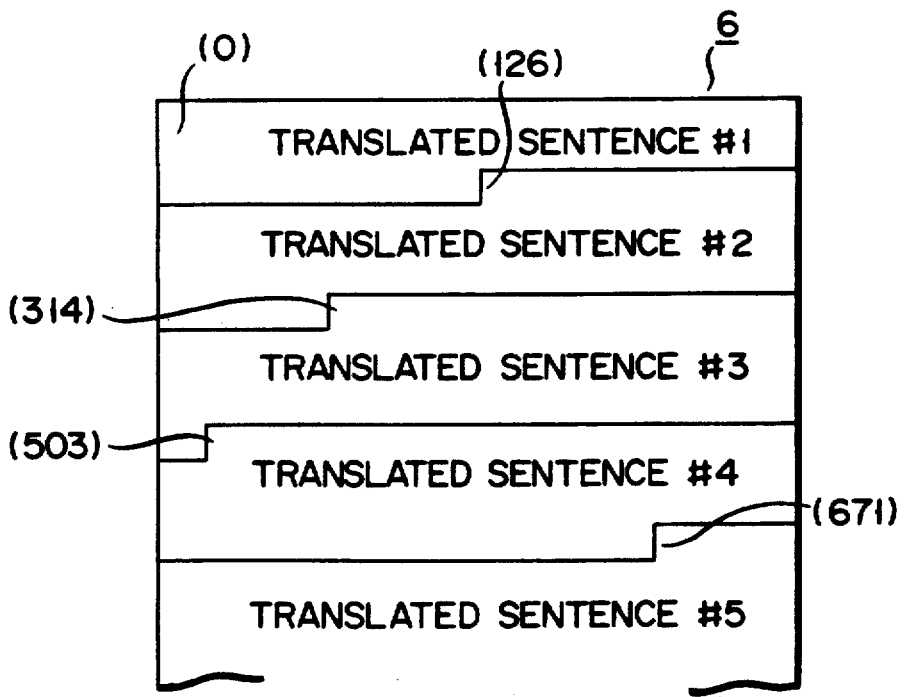

Original sentences are sequentialy input from input section 1 and are stored in storage section 2 using a format, e.g., shown in FIG. 6A. In this case, these original sentences are stored in section 2 to be managed in terms of their storage starting addresses and the number of characters constituting each sentence. In contrast to this, the translated sentences obtained from the corresponding original sentences are stored in storage section 6 using a format, e.g., shown in FIG. 6B, to be managed in terms of their storage starting addresses and the number of characters constituting each sentence in the same manner as original sentences.

Edit control section 3 manages the original and translated sentences to correspond to each other using their storage starting addresses in storage sections 2 and 6 as pointers, as shown in FIG. 6C. More specifically, original sentence #1 is stored from address 0 of storage section 2, and translated sentence #1 is stored from address 0 of storage section 6. Thus, edit control section 3 manages sentences #1 to correspond to each other, so that it sets an original-sentence pointer for sentence #1 to be (0) and sets a translated-sentence pointer for sentence #1 to be (0). Similarly, since original sentence #2 is stored from address 117 of section 2 and translated sentence #2 is stored from address 126 of section 6, edit control section 3 manages these sentences to correspond to each other, so as to set the original-sentence pointer to be (117) and set the translated-sentence pointer to be (126).

Display control section 7 controls the original and translated sentences managed and stored in sections 2 and 6, respectively, as follows, in accordance with a display mode designated from the keyboard of input section 1 (e.g., function keys 1d).

Figure 7:
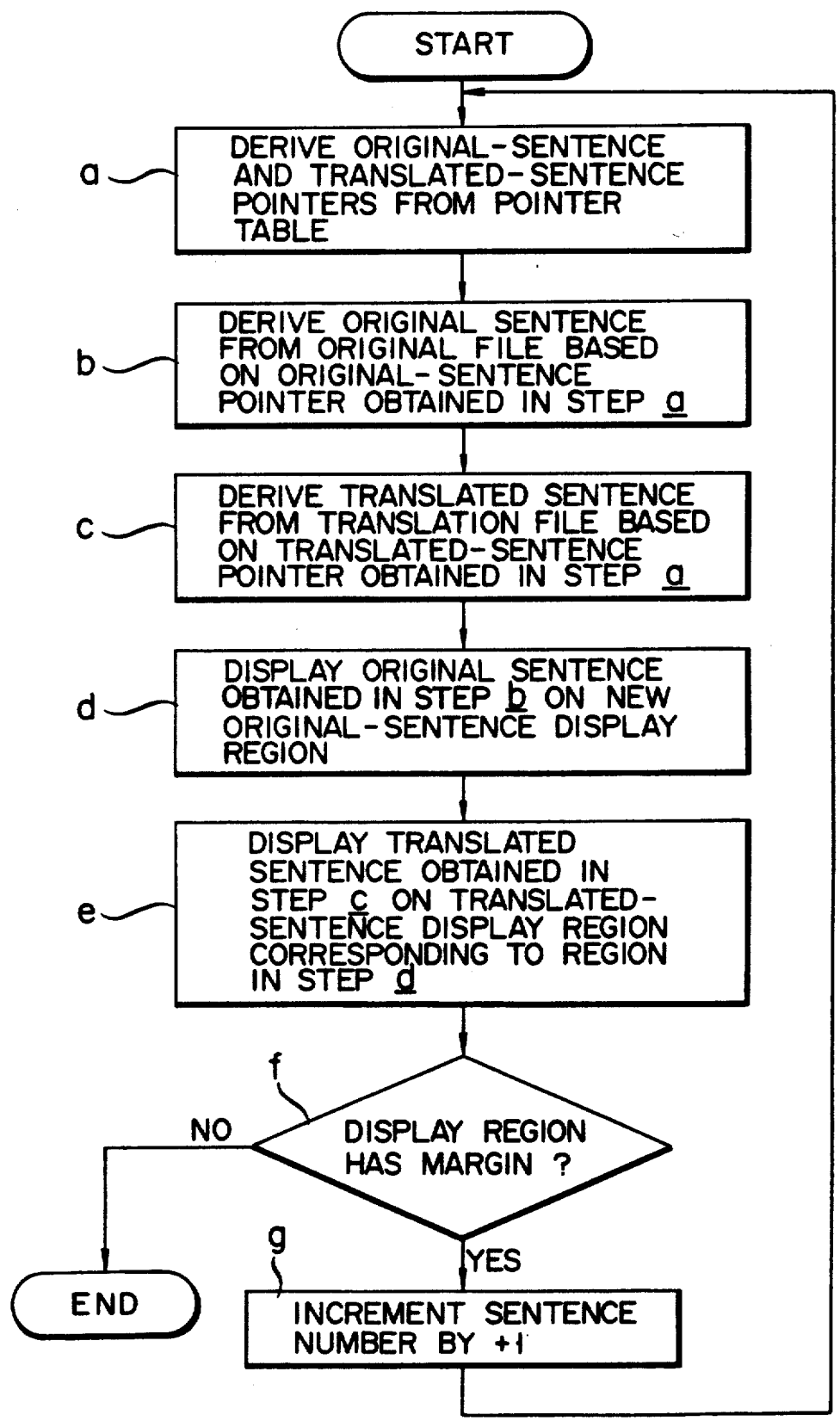
FIG. 7 is a flow chart of a control sequence of a first display mode as a comparison display mode of the original and translated sentences in the system of FIG. 1.

More specifically, since display control section 7 executes display control, in step 0 shown in FIG. 4, in the first display mode in which the original and translated sentences are displayed to correspond to each other, the first display mode is selected in the normal state. In the first display mode, display of the original and translated sentences stored in sections 2 and 6 is controlled in accordance with a control sequence, e.g., shown in FIG. 7.

More specifically the original-sentence and translated-sentence pointers associated with the first sentence number are derived from a table shown in FIG. 6C (step a). An original sentence specified by the original-sentence pointer is derived from storage section 2 (step b). Similarly, a translated sentence specified by the translated-sentence pointer is derived from section 6 (step c).

Figure 8A:
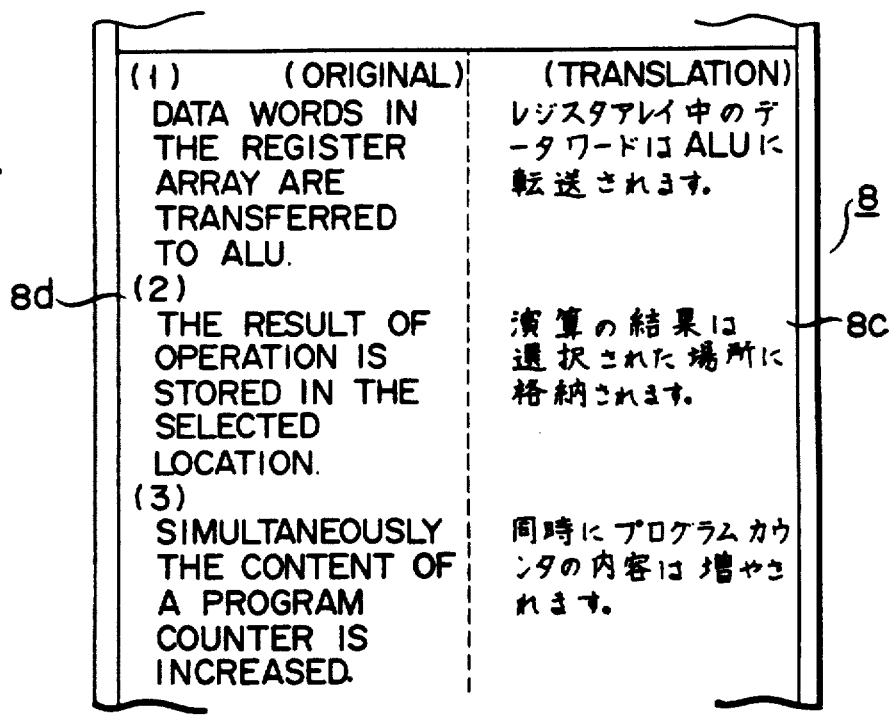
FIGS. 8A to 8C are representations showing the display states of the original and translated sentences in the system of FIG. 1.

Thereafter, the original sentence obtained in step b is displayed on region 8b of display section 8. In this case, the original sentence is displayed in a new paragraph after its sentence number, as shown in FIG. 8A, so as to distinguish it from the previous sentences. The translated sentence obtained in step c is displayed on region 8c of section 8, so that its display position is aligned with the display start line position of the corresponding original sentence. As a result, the original and translated sentences are displayed on the respective display regions dividing the display screen so that their display start line positions coincide with each other.

In this manner, after a single original sentence and its translated sentence are displayed to correspond to each other, it is checked in step f if there is a margin for displaying other sentences on the remaining display regions.

If YES in step f, the sentence number is incremented by one (step g), and the next original sentence and the corresponding translated sentence are similarly read out. When this processing is repeated sequentially, a plurality of original sentences and translated sentences corresponding thereto are displayed to correspond to each other.

Display control in the second and third display modes is performed as one processing (step K in FIG. 4) corresponding to an operated function key.

Figure 9:
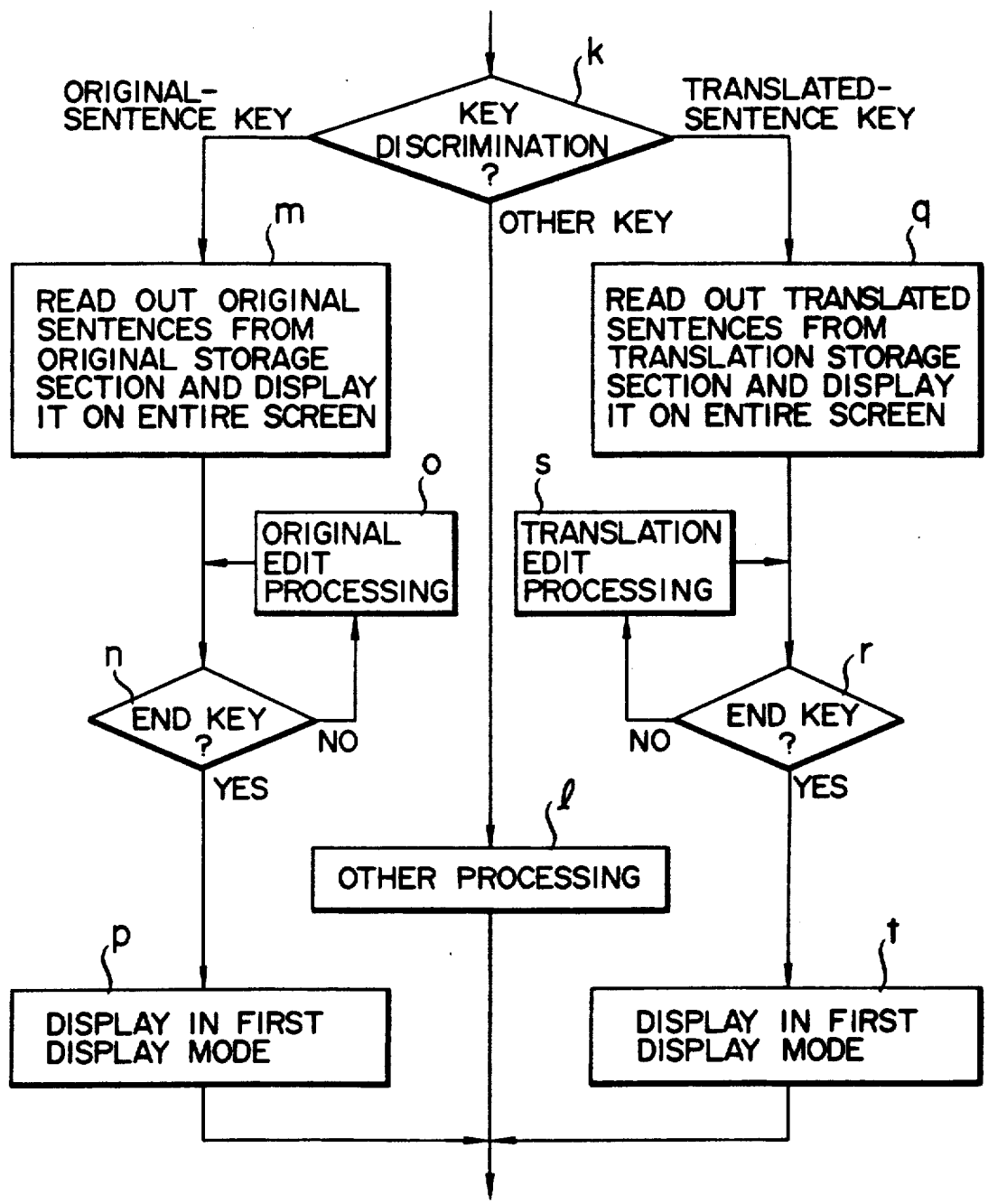
FIG. 9 is a flow chart of a control sequence for switching a display mode in the system shown in FIG. 1.

FIG. 9 shows detailed processing (step K in FIG. 4) corresponding to the function keys.

In this case, function keys 1d on the keyboard as input section 1 include an "original-sentence key" for designating an original display mode as the second display mode and a "translated-sentence key" for designating a translation display mode as the third display mode.

When function key 1d is depressed, it is checked in step k whether the depressed function key is the "original-sentence key"]or "translated-sentence key" or other key. If it is determined in step k that the depressed key is other than the "original-sentence key" and the "translated-sentence key", the flow advances to step λ, and processing corresponding to the depressed key is executed, thus ending the processing (the flow returns to step A in FIG. 4).

Figure 8B:
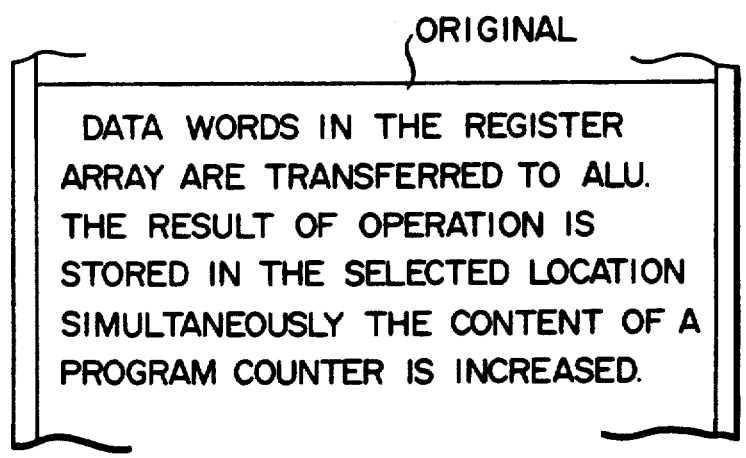

If the depressed key is the "original-sentence key", since the second display mode for displaying only the original sentence is selected, display control section 7 successively reads out the original sentences stored in storage section 2, and successively displays a plurality of original sentences using all or almost all the display screen (i.e., interrupting division display of display regions) (step m), as shown in FIG. 8B. Thus, the operation mode is switched to an edit mode for the original sentences, and edit processing using character keys 1a, edit keys 1c, and the like is executed until an end key is depressed (steps n and o). When the end key is depressed, the first display mode is restored (step p: processing shown in FIG. 7), thus ending the processing (the flow returns to step A in FIG. 4).

Figure 8C:
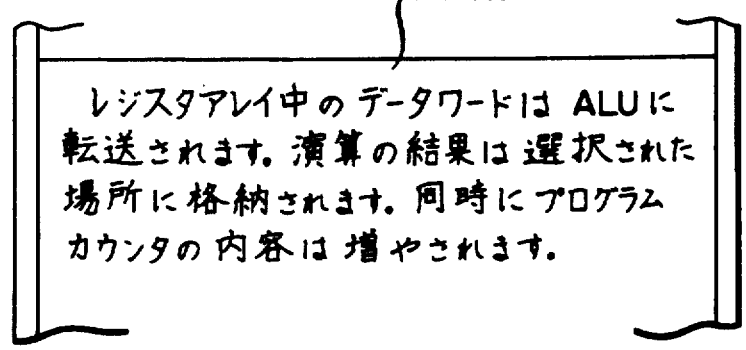

If the depressed key is the "translated-sentence key", since the third display mode for displaying only the translated sentences is selected, display control section 7 successively reads out the translated sentences stored in storage section 6, and displays a plurality of translated sentences using all or almost all the display screen of display section 8 (i.e., interrupting division display of the display regions) (step q), as shown in FIG. 8C. The display mode is thus switched to an edit mode for the translated sentences, and edit processing using character keys 1a, edit keys 1c, and the like is executed until the end key is depressed (steps r and s). When the end key is depressed, the first display mode (step t) is restored in the same manner as in step 0 in FIG. 4, thus ending the processing (step t: the processing in FIG. 7), thus ending the processing (the flow returns to step A in FIG. 4).

Display of the original or translated sentences in step m or q is made by successively reading out a plurality original or translated sentences as long as the display region has a margin.

With the system of this embodiment which performs display control described above, the original sentences are successively displayed in the second display mode to allow easy understanding of the entire original document. In the third display mode, the translated sentences are successively displayed to allow easy understanding of the entire translated document. In addition, in the first display mode, the original and translated sentences are displayed to correspond to each other to allow easy and reliable understanding of the correspondence between original words and translated words, thus efficiently supporting the translatedsentence correction processing.

Therefore, an operator can confirm the context or consistency of translated sentences while grasping the context or consistency of original sentences, and can carry out effective translation/edit processing of original and translated sentences displayed to correspond with each other.

According to the system of the present invention, translated sentences having appropriate linguistical expression can be obtained taking the context of original sentences into consideration. In addition, simple, efficient translation/edit processing can be realized.

Note that the present invention is not limited to the above embodiment.

For example, the format for divisional display regions of display section 8 can be appropriately determined in accordance with the specifications of the system.

When original and translated sentences are displayed to correspond to each other, a difference in sentence lengths caused by different linguistic forms may occur. In this case, if a predetermined number of blank lines are displayed below each dislayed original sentence, the display start line position of each translated sentence can be aligned with that of a corresponding original sentence.

Switching control for the display modes is not limited to that described above. For example, switching control can be performed by interruption processing by means of keys. Alternatively, switching control can be performed only during specific processing, e.g., edit processing.

Various other changes and modifications may be made within the spirit and scope of the invention.

What is claimed is:

1. A machine translation system comprising:
original storing means for storing a plurality of translation processing units of an original text;
dictionary means for storing linguistical information necessary for translation processing for the original text;
translation section means, operatively connected to said original storing means and to said dictionary means, for translating each translation processing unit of the original text stored in said original storing means with reference to the linguistical information;
translation storing means, operatively connected to said translation section means, for storing a translated text including each translated translation processing unit obtained by said translation section means together with information indicating a correspondence between each translation processing units of the original and translated texts;
edit processing means, operatively connected to said original and translation storing means and to said translation section means, for executing edit processing for the original and translated texts;
display means having a display screen, for displaying at least one of the original and translated texts;
display control means operatively connected to said edit processing means and to said display means, for controlling said display means;
input means, operatively connected to said edit processing means for inputting instruction information for said translation section means and said edit processing means;
said display control means including,
display mode control means for controlling said display means
in a first display mode for displaying the original and translated text respectively in original and translation display sections of the display screen, so that each of the translation processing units of the original text is displayed in horizontal lines as one paragraph in the original display section, and each of the translation processing units of the translated text is displayed in horizontal lines as one paragraph in the translation display section, and a display position of each translation processing unit of the original text and a corresponding translation processing unit of the translated text start at the same horizontal line in the display screen,
in a second display mode for displaying the original text in horizontal lines on the entire display screen with the translation processing units of the original text displayed continuously, and
in a third display mode for displaying the translated text in horizontal lines on the entire display screen with the translation processing units of the translated text displayed continuously, and
mode discrimination means for discriminating a selected one of the three display modes and controlling the display mode control means; and
said input means including means for inputting information for instructing one of the three display modes to be discriminated by said mode discrimination means.

2. A system according to claim 1, wherein said display control means comprises means for selecting the first display mode, and for selecting the second or third display mode only when the information for instructing the second or the third display mode is input by said input means.

3. A system according to claim 1, wherein said display control means includes means for displaying edit information on a predetermined region of the display screen other than the original and translation display sections, said edit information for assisting an operator in edit processing.

4. A system according to claim 1, wherein, when said linguistic information contains at least two possible translations for one of the translation processing units of the original text, said display control means causes said display means to display one of the possible translations and to indicate that there is at least another possible translation.

5. A system according to claim 1, wherein said display control means includes means for displaying blank lines in such numbers that, when any translation processing unit of the original text and a corresponding translation processing unit of the translated text are displayed in different numbers of lines, a first line of the translation processing unit displayed in less lines will be displayed horizontally aligned with a first line of the translation processing unit displayed in more lines.

* * * * *